United States Patent
Serwatowski

(10) Patent No.: US 12,052,341 B2
(45) Date of Patent: *Jul. 30, 2024

(54) SYSTEMS AND METHODS OF ENABLING BLOCKCHAIN-BASED BUILDING AUTOMATION SYSTEMS

(71) Applicant: Johnson Controls Tyco IP Holdings LLP, Milwaukee, WI (US)

(72) Inventor: Kevin Serwatowski, Royal Oak, MI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,886

(22) Filed: Aug. 9, 2023

(65) Prior Publication Data

US 2023/0388144 A1  Nov. 30, 2023

Related U.S. Application Data

(63) Continuation of application No. 17/888,963, filed on Aug. 16, 2022, now Pat. No. 11,764,989, which is a
(Continued)

(51) Int. Cl.
*H04L 29/06* (2006.01)
*G06F 16/182* (2019.01)
(Continued)

(52) U.S. Cl.
CPC ........ *H04L 9/0637* (2013.01); *G06F 16/1834* (2019.01); *H04L 9/0643* (2013.01);
(Continued)

(58) Field of Classification Search
None
See application file for complete search history.

(56) References Cited

U.S. PATENT DOCUMENTS

2018/0094953 A1  4/2018  Colson et al.
2018/0117447 A1  5/2018  Tran et al.
(Continued)

FOREIGN PATENT DOCUMENTS

KR  10-2084674 B  3/2020
WO  WO-2017/167399 A1  10/2017
(Continued)

OTHER PUBLICATIONS

International Search Report and Written Opinion on International Application No. PCT/IB2019/059243, mail date Jan. 7, 2020, 11 pages.
(Continued)

*Primary Examiner* — Andrew J Steinle
(74) *Attorney, Agent, or Firm* — Foley & Lardner LLP

(57) ABSTRACT

A system includes a plurality of first building components, a private local blockchain, a second building component, and a client device. The private local blockchain includes a device ledger indicating each first building component, a transaction ledger maintaining a plurality of blocks corresponding to a transaction between at least two first building components and including at least one first unique identifier of the corresponding first building component and a timestamp of the transaction, a transaction processor that generates at least one block by executing a predetermined hash function using a previous block, and a local rule engine defining rules to evaluate a transaction. The second building component has at least one second unique identifier. The client device provides the at least one second unique identifier to the private local blockchain. The private local blockchain determines whether to add the second building component to the device ledger.

20 Claims, 8 Drawing Sheets

Related U.S. Application Data continuation of application No. 16/665,837, filed on Oct. 28, 2019, now Pat. No. 11,431,520.

(60) Provisional application No. 62/752,025, filed on Oct. 29, 2018.

(51) Int. Cl.
*H04L 9/06* (2006.01)
*H04L 9/32* (2006.01)
*H04L 12/28* (2006.01)
*G06K 7/14* (2006.01)

(52) U.S. Cl.
CPC .......... *H04L 9/3236* (2013.01); *H04L 12/281* (2013.01); *H04L 12/282* (2013.01); *G06K 7/1417* (2013.01)

(56) References Cited

U.S. PATENT DOCUMENTS

| | | | | |
|---|---|---|---|---|
| 2019/0370866 | A1* | 12/2019 | Lawbaugh | G06Q 30/0277 |
| 2020/0072706 | A1* | 3/2020 | Roberts | G08B 21/185 |

FOREIGN PATENT DOCUMENTS

| | | | | |
|---|---|---|---|---|
| WO | WO-2017167399 A1 * | 10/2017 | ........... | B29C 64/386 |
| WO | WO-2017/194976 A1 | 11/2017 | | |
| WO | WO-2017194976 A1 * | 11/2017 | ........... | G06Q 10/087 |

OTHER PUBLICATIONS

European Office Action on EP Appl. No. 19797384.5 dated Jan. 26, 2024 (7 pages).

\* cited by examiner

SYSTEMS AND METHODS OF ENABLING BLOCKCHAIN-BASED BUILDING AUTOMATION SYSTEMS

CROSS-REFERENCE TO RELATED APPLICATIONS

The present disclosure is a continuation of U.S. patent application Ser. No. 17/888,963, filed Aug. 16, 2022, which is a continuation of U.S. patent application Ser. No. 16/665,837, filed Oct. 28, 2019, which claims the benefit of and priority to U.S. Provisional Application No. 62/752,025, titled "SYSTEMS AND METHODS OF ENABLING BLOCKCHAIN-BASED BUILDING AUTOMATION SYSTEMS," filed Oct. 29, 2018, each of which is incorporated herein by reference for all purposes.

BACKGROUND

Commercial buildings typically using large building control systems such as fire detection systems, heating, ventilation, and air conditioning (HVAC) systems, access control systems, and video surveillance systems.

SUMMARY

One implementation of the present disclosure is a system. The system includes a plurality of first building components, a private local blockchain, a second building component, and a client device. Each first building component has at least one first unique identifier. The private local blockchain is implemented by the plurality of first building components and includes a device ledger that maintains a data structure indicating each first building component, a transaction ledger that maintains a plurality of blocks, each block corresponding to a transaction between at least two first building components of the plurality of first building components, each block including the at least one first unique identifier of the corresponding first building component and a timestamp of the corresponding transaction, a transaction processor that generates at least one block by executing a predetermined hash function using a previous block, and a local rule engine defining one or more rules used to evaluate the transaction of one or more blocks. The second building component has at least one second unique identifier. The client device identifies the at least one second unique identifier of the second building component and provides the at least one second unique identifier to the private local blockchain. The private local blockchain uses the at least one second unique identifier and the local rule engine to determine to add the second building component to the device ledger.

Another implementation of the present disclosure is a method. The method includes maintaining, by a device ledger of a private local blockchain, a data structure indicating a plurality of building components of the private local blockchain, each first building component having at least one first unique identifier; maintaining, by a transaction ledger of the private local blockchain, a plurality of blocks, each block corresponding to a transaction between at least two first building components of the plurality of first building components, each block including the at least one first unique identifier of the corresponding first building component and a timestamp of the corresponding transaction; generating, by a transaction processor of the private local blockchain, at least one block by executing a predetermined hash function using a previous block; identifying, by a client device, at least one second unique identifier of a second building component; providing, by the client device, the at least one second unique identifier to the private local blockchain; and determining to add, by the private local blockchain using the at least one second unique identifier and the local rule engine, the second building component to the device ledger.

DETAILED DESCRIPTION

Overview

Figure 1:
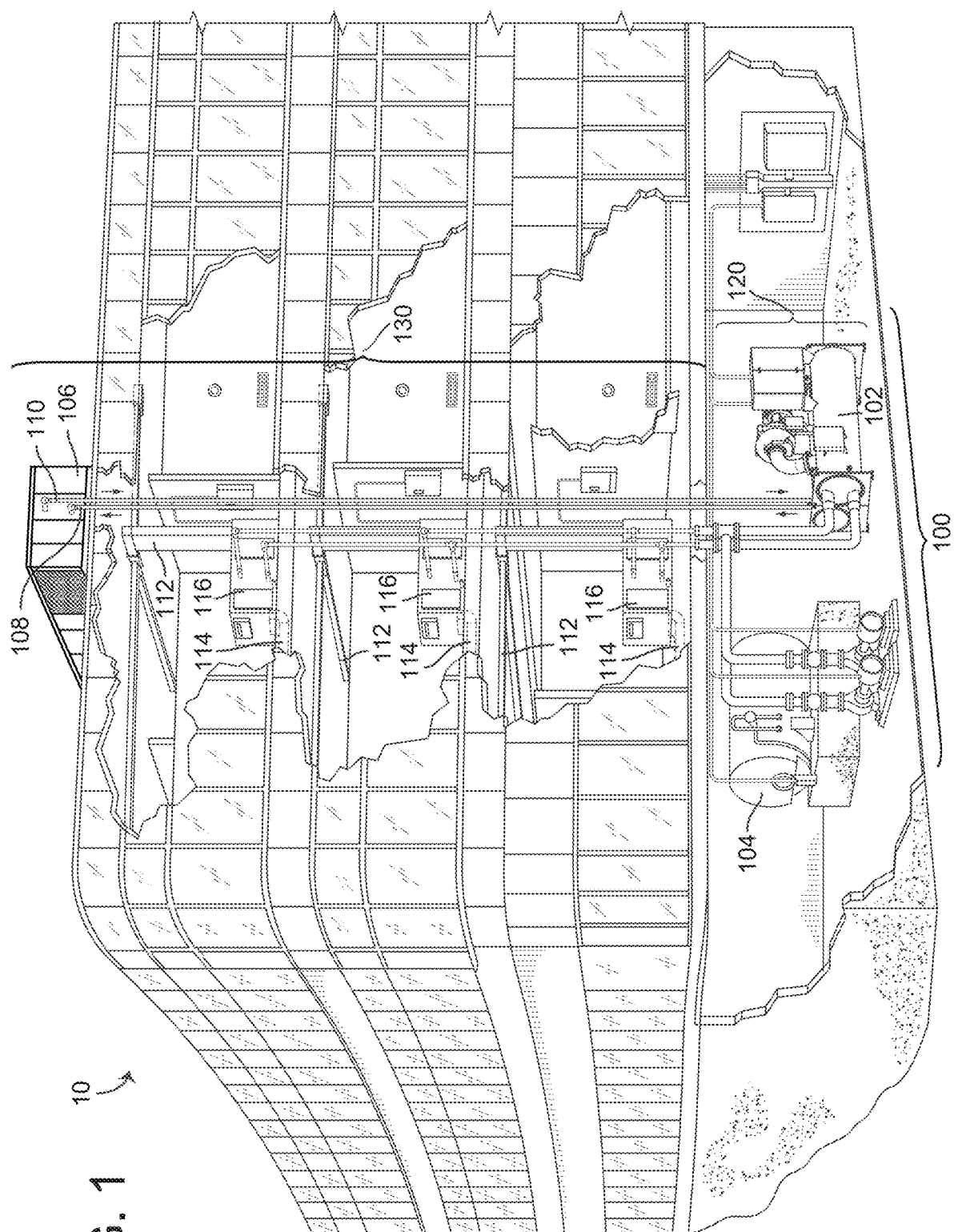
FIG. 1 is a drawing of a building equipped with a HVAC system, according to an embodiment.

The present disclosure relates generally to the field of HVAC systems, and more particularly to systems and methods of enabling blockchain-based HVAC systems. Referring generally to the Figures, in some embodiments, a system includes a plurality of first building components, a private local blockchain, a second building component, and a client device. Each first building component has at least one first unique identifier. The private local blockchain is implemented by the plurality of first building components and includes a device ledger that maintains a data structure indicating each first building component, a transaction ledger that maintains a plurality of blocks, each block corresponding to a transaction between at least two first building components of the plurality of first building components, each block including the at least one first unique identifier of the corresponding first building component and a timestamp of the corresponding transaction, a transaction processor that generates at least one block by executing a predetermined hash function using a previous block, and a local rule engine defining one or more rules used to evaluate the transaction of one or more blocks. The second building component has at least one second unique identifier. The client device identifies the at least one second unique identifier of the second building component and provides the at least one second unique identifier to the private local blockchain. The private local blockchain uses the at least one second unique identifier and the local rule engine to determine to add the second building component to the device ledger.

Existing devices and systems, such as HVAC systems, sensors, smart devices (e.g., devices that may have a local processing circuit and communications hardware for communicating data to/from remote devices), and other systems that operate in an Internet-of-Things (IoT) paradigm, may have significant challenges associated with security, including electronically communicating data that is used to properly operate devices in the system while maintaining security of private or sensitive data maintained by the devices, and connectivity, including. For example, devices may not have a clear authentication standard to follow. Critical infrastructure can be compromised if devices are compromised. Device incompatibility may result from devices from disparate manufacturers being expected to operate together in a common infrastructure, such as home automation systems and building management systems.

The present solution can implement blockchain technologies in electronic sensor, controls, and security systems, including HVAC systems, to improve data security, equipment monitoring, device authentication, standardization, energy efficiency, and system robustness. The present solution can enable a distributed architecture implemented using blockchain to address technical, security, and trust challenges, such as a dual layer, private/public blockchain. For example, the present solution can enable a verifiable, secure, and tamper-proof system that stores and shares data provided by HVAC equipment, smart devices, and sensors. In some embodiments, the present solution enables a common, integrated platform that can be used to manage disparate devices on the platform. As such, systems and methods in accordance with the present disclosure can use of several types of automation, allow devices and equipment to work together more efficiently, monitor and save energy, and use preventative maintenance to protect equipment; the increased automation capabilities can reduce the risk of equipment failure that can lead to critical infrastructure being down.

In some embodiments, the present solution uses a distributed ledger to enable devices to be identifying and verified with less overhead and greater security. The distributed ledger may increase system robustness by eliminating a single point of failure. In some embodiments, the present solution implements a blockchain to collect and accurately track sensor data to ensure no duplication of entries and assure that there is no malicious data input. In some embodiments, the present solution enables devices to communicate data using the blockchain. The present solution can implement smart contracts to enable device autonomy, guaranteeing integrity of data and facilitating peer to peer communication. In some embodiments, the present solution maintains a history of all connected devices, facilitating troubleshooting and maintenance. The present solution can allow multiple tiers of authorized agents for a particular building (e.g., building managers and tenants of respective areas of the building) to automate maintenance, efficiency, security, and local preferences (e.g., building managers can control top level rules, while enabling non-administrative users to control lower level functions).

Building Management System and HVAC System

Referring now to FIGS. 1-4, an exemplary building management system (BMS) and HVAC system in which the systems and methods of the present disclosure can be implemented is depicted. Referring particularly to FIG. 1, a perspective view of a building 10 is shown. Building 10 is served by a BMS. A BMS is, in general, a system of devices that can control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) that provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers that pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In some embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) that measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
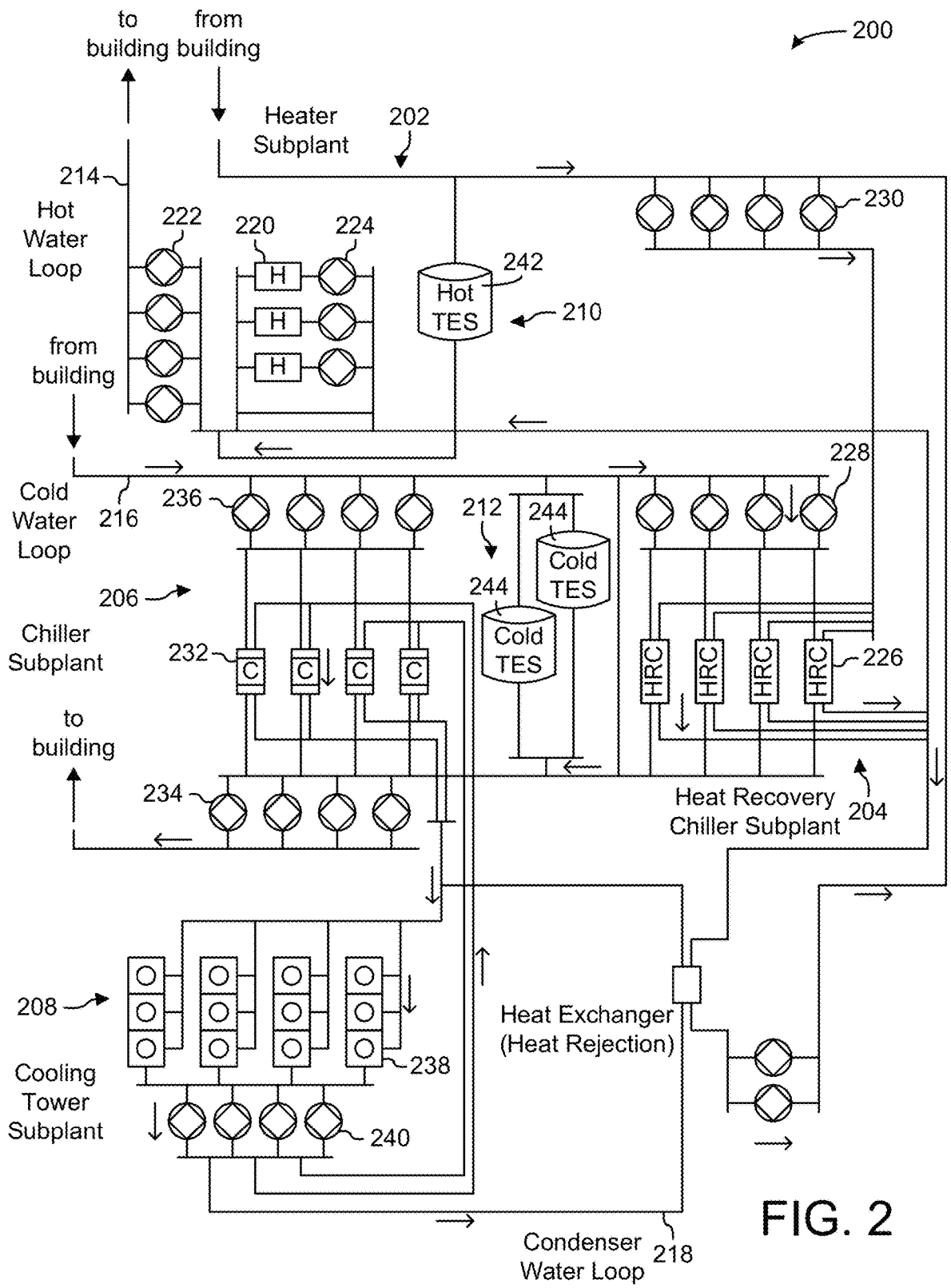
FIG. 2 is a schematic diagram of a waterside system which may be used in conjunction with the building of FIG. 1, according to an embodiment.

Referring now to FIG. 2, a block diagram of a waterside system 200 is depicted. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is depicted as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can heat water in a hot water loop 214 that circulates the hot water between heater subplant 202 and building 10. Chiller subplant 206 can chill water in a cold water loop 216 that circulates the cold water between chiller subplant 206 building 10. Heat recovery chiller subplant 204 can transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In some embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment that can facilitate the functions of the subplant. For example, heater subplant 202 is shown to include a plurality of heating elements 220 (e.g., boilers, electric heaters, etc.) that add heat to the hot water in hot water loop 214. Heater subplant 202 is also shown to include several pumps 222 and 224 that circulate the hot water in hot water loop 214 and to control the flow rate of the hot water through individual heating elements 220. Chiller subplant 206 is shown to include a plurality of chillers 232 that remove heat from the cold water in cold water loop 216. Chiller subplant 206 is also shown to include several pumps 234 and 236 that circulate the cold water in cold water loop 216 and control the flow rate of the cold water through individual chillers 232.

Heat recovery chiller subplant 204 is shown to include a plurality of heat recovery heat exchangers 226 (e.g., refrigeration circuits) that can transfer heat from cold water loop 216 to hot water loop 214. Heat recovery chiller subplant 204 is also shown to include several pumps 228 and 230 that can circulate the hot water and/or cold water through heat recovery heat exchangers 226 and to control the flow rate of the water through individual heat recovery heat exchangers 226. Cooling tower subplant 208 is shown to include a plurality of cooling towers 238 that can remove heat from the condenser water in condenser water loop 218. Cooling tower subplant 208 is also shown to include several pumps 240 that can circulate the condenser water in condenser water loop 218 and to control the flow rate of the condenser water through individual cooling towers 238.

Hot TES subplant 210 is shown to include a hot TES tank 242 that can store the hot water for later use. Hot TES subplant 210 can also include one or more pumps or valves that can control the flow rate of the hot water into or out of hot TES tank 242. Cold TES subplant 212 is shown to include cold TES tanks 244 that can store the cold water for later use. Cold TES subplant 212 can also include one or more pumps or valves that can control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
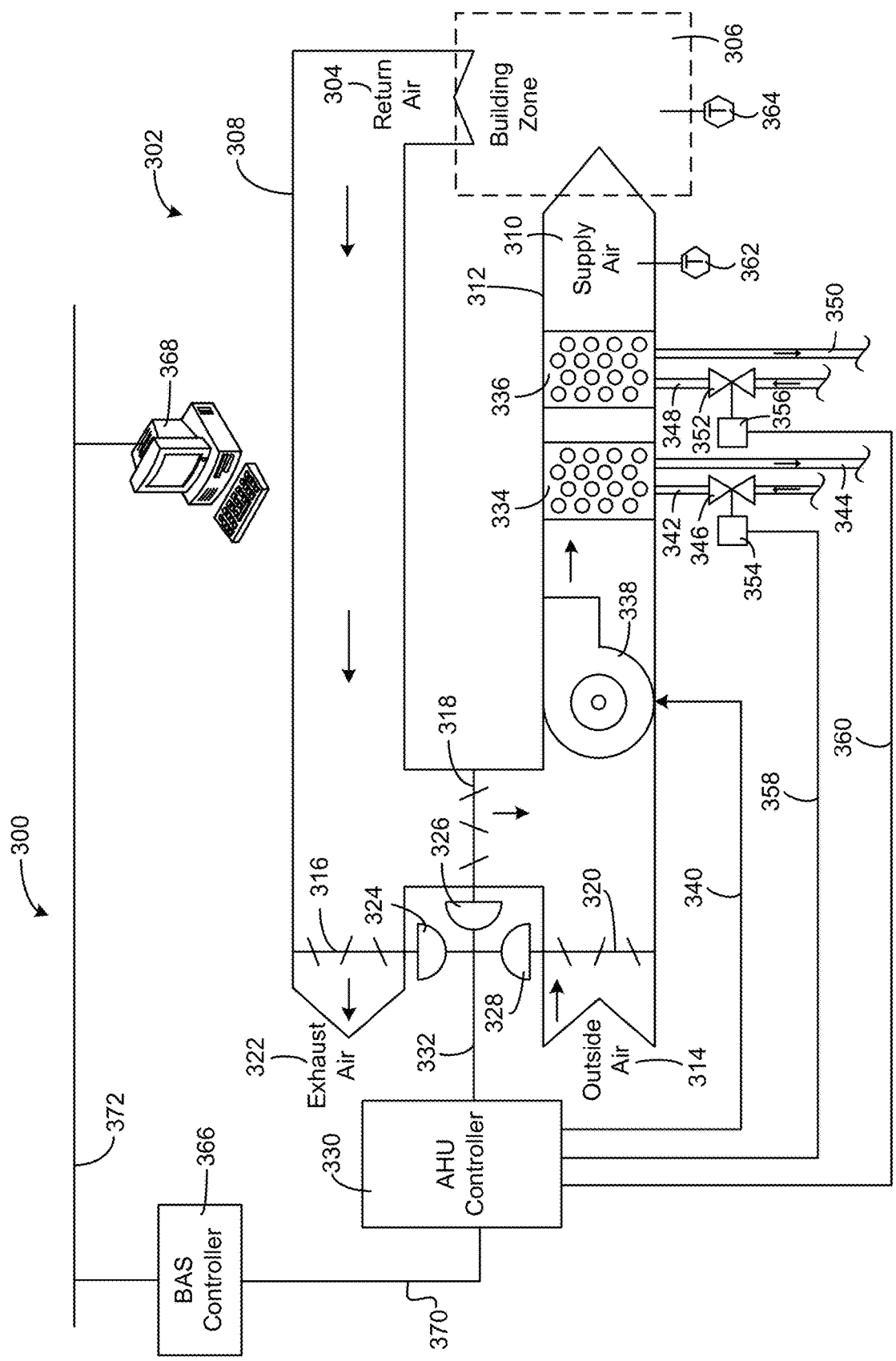
FIG. 3 is a schematic diagram of an airside system which may be used in conjunction with the building of FIG. 1, according to an embodiment.

Referring now to FIG. 3, a block diagram of an airside system 300 is depicted. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is depicted to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as depicted in FIG. 1) or otherwise positioned to receive both return air 304 and outside air 314. AHU 302 can be that can operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller that can use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be that can force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is depicted to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
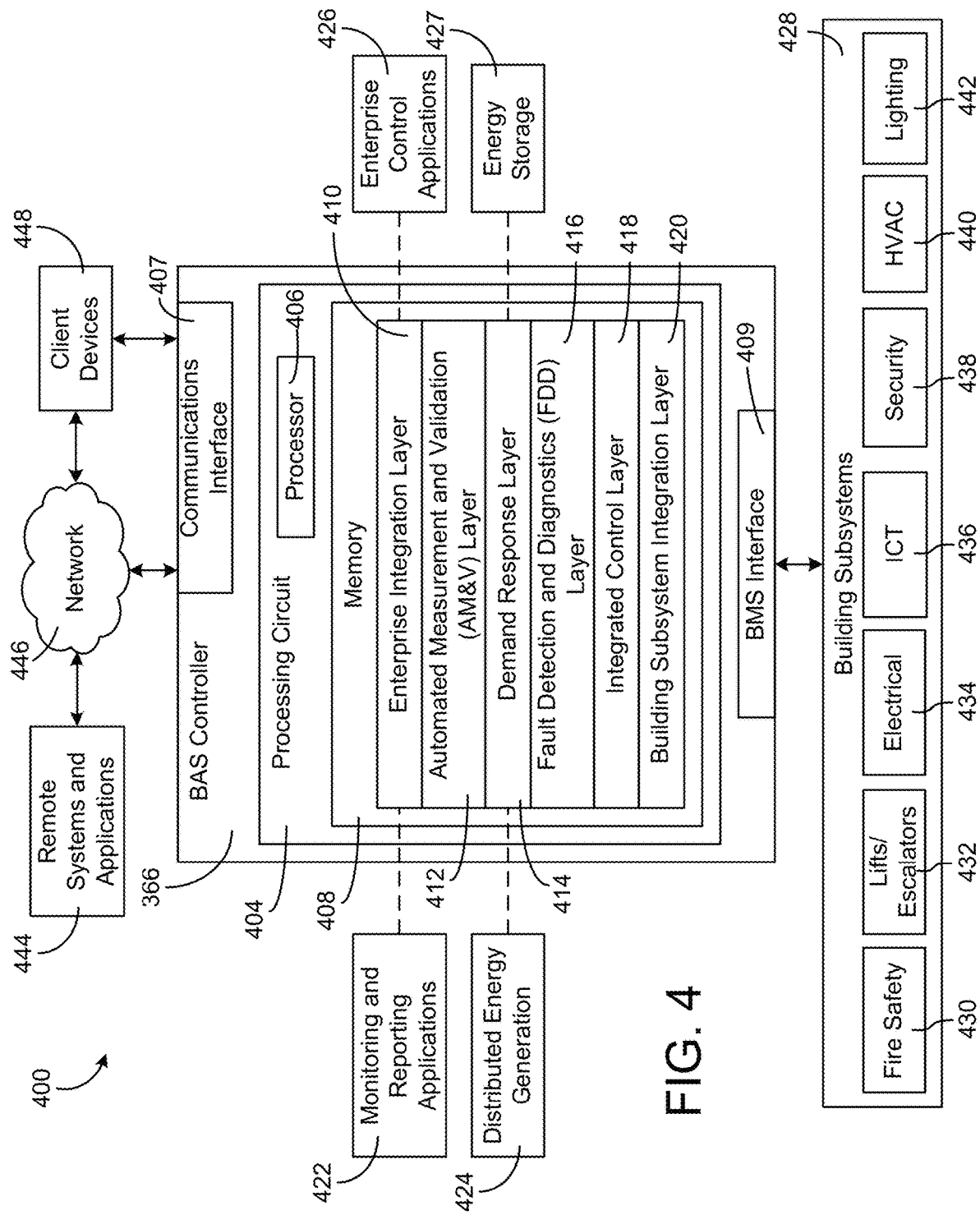
FIG. 4 is a block diagram of a building management system (BMS) which may be used to monitor and control the building of FIG. 1, according to an embodiment.

Referring now to FIG. 4, a block diagram of a building management system (BMS) 400 is depicted. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. Building subsystems 428 can include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices that can controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In some embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be serve clients or local applications with information and services to support a variety of enterprise-level applications. For example, enterprise control applications 426 can provide subsystem-spanning control to a graphical user interface (GUI) or to any number of enterprise-level business applications (e.g., accounting systems, user identification systems, etc.). Enterprise control applications 426 can provide configuration GUIs for configuring BMS controller 366. In some embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also manage communications between building subsystems 428. Building subsystem integration layer 420 translate communications (e.g., sensor data, input signals, output signals, etc.) across a plurality of multi-vendor/multi-protocol systems.

Demand response layer 414 can optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic to determine when to utilize stored energy. For example, demand response layer 414 can determine to begin using energy from energy storage 427 just prior to the beginning of a peak use hour.

In some embodiments, demand response layer 414 includes a control module that can actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can provide calculated inputs (e.g., aggregations) to these higher levels based on outputs from more than one building subsystem.

Automated measurement and validation (AM&V) layer 412 can verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm that can attempt to repair the fault or to work-around the fault.

FDD layer 416 can output a specific identification of the faulty component or cause of the fault (e.g., loose damper linkage) using detailed subsystem inputs available at building subsystem integration layer 420. In other exemplary embodiments, FDD layer 416 can provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Systems and Methods of Enabling Blockchain-Based Building Automation Systems

Figure 5:
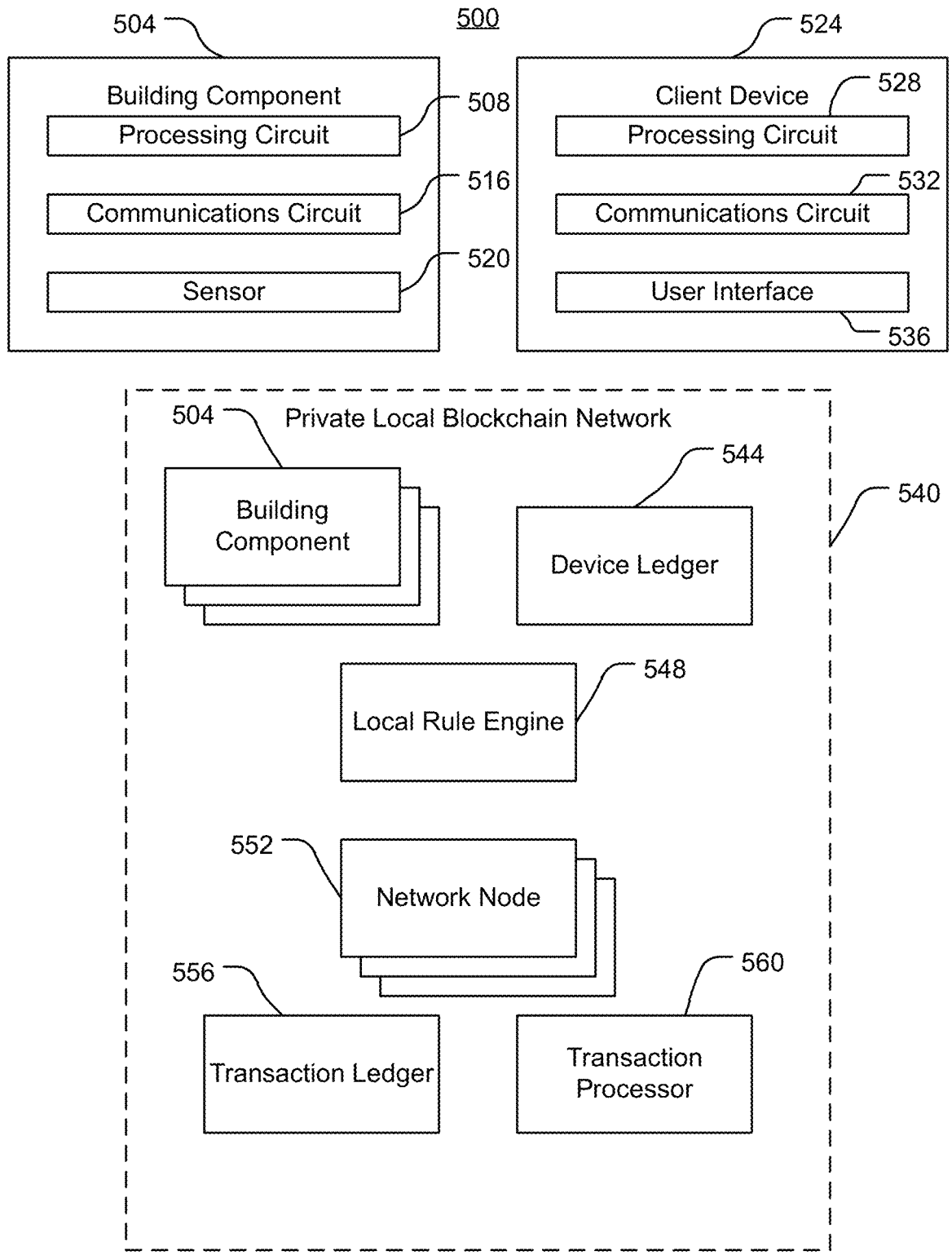
FIG. 5 is a block diagram of a distributed building system (DBS) including a private local blockchain, according to an embodiment.

Referring now to FIG. 5, a distributed building system (DBS) 500 is depicted. The DBS 500 can be implemented using various systems described herein, including the BMS 400, for various facilities including homes and buildings.

The DBS 500 includes a plurality of building components 504. The plurality of building components 504 can include smart devices such as sensors, actuators, controllers, HVAC components, and switches. Each building component 504 can include a processing circuit 508 and a communications circuit 520.

The processing circuit 508 can include a processor and memory. The processor can be a general purpose or specific purpose processor, an application specific integrated circuit (ASIC), one or more field programmable gate arrays (FPGAs), a group of processing components, or other suitable processing components. The processor can execute computer code or instructions stored in memory or received from other computer readable media (e.g., CDROM, network storage, a remote server, etc.). The memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processor via processing circuit 508 and may include computer code for executing (e.g., by processor) one or more processes described herein. When processor executes instructions stored in memory, processor generally configures the processing circuit 508 to complete such activities.

The communications circuit 520 can be used to transmit data to and from the processing circuit 508. The communications circuit 520 can include wired or wireless interfaces (e.g., jacks, antennas, transmitters, receivers, transceivers, wire terminals) for conducting data communications with various systems, devices, or networks. For example, the communications circuit 520 can include an Ethernet card and port for sending and receiving data via an Ethernet-based communications network. The communications circuit 520 can include a WiFi transceiver for communicating via a wireless communications network. The communications circuit 520 can communicate via local area networks (e.g., a building LAN), wide area networks (e.g., the Internet, a cellular network), and/or conduct direct communications (e.g., near field communication (NFC), BLUETOOTH). In some embodiments, the communications circuit 520 can conduct wired and/or wireless communications.

The processing circuit 508 and/or communications circuit 520 can be encrypted. For example, building component 504 may request an encryption key when receiving data access requests that are not provided via the private local blockchain 540. As such, the DBS 500 can maintain a level of security associated with direct access of the building components 504, and also use the private local blockchain 540 to improve the security of data shared by the building components 504.

The processing circuit 508 can execute one or more functions of the private local blockchain 540 described below. For example, the processing circuit 508 can maintain an instance of the transaction ledger 556, enabling the private local blockchain 540 to be distributed.

The DBS 500 can include a client device 524. The client device 524 includes processing circuit 528 and communications circuit 532, which may be respectively similar to the processing circuit 508 and communications circuit 520 of the building component 504. The client device 425 includes a user interface 536. The user interface 536 can receive user input and present information regarding operation of the client device 524. The user interface 536 may include one or more user input devices, such as buttons, dials, sliders, or keys, to receive input from a user. The user interface 536 may include one or more display devices (e.g., OLED, LED, LCD, CRT displays), speakers, tactile feedback devices, or other output devices to provide information to a user. The user interface 536 may execute a distributed application to receive user preference data.

Private Local Blockchain

Each building component 504 can be connected to a private local blockchain 540. The private local blockchain 540 enables secure data access control amongst the building components 504, as well as with client device(s) 524. The private local blockchain 540 can be distributed amongst various components, including building components 504 that are added to the private local blockchain 540 and network nodes 552, as described further herein. The private local blockchain 540 can maintain data exchanges amongst the building components 504 in a confidential, immutable manner, reducing the computational resources required for each building component 504 to provide such functionality.

The private local blockchain 540 can maintain a device ledger 544 indicating each building component 504 that is on the private local blockchain 540, such as being authorized to communicate amongst devices of the private local blockchain 540. The private local blockchain 540 can add each building component 504 to the private local blockchain 540. In some embodiments, the private local blockchain network 540 adds the building component 504 to the private local blockchain network 540 by adding a device identifier of the building component 504 to the device ledger 544. The private local blockchain network 540 can similarly remove the building component 504 by removing the device identifier of the building component 504 from the device ledger 544. After each building component 504 is added to the private local blockchain 540, the building component 504 can use the private local blockchain 540 to execute various actions, data retrieval, and communications, including access control, stored user preferences, home automation, system and equipment monitoring, energy management, and equipment troubleshooting and warranty.

The device identifier may include a unique identifier and a public identifier. For example, the unique identifier may be an identifier specific to the building component 504, while the public identifier may indicate a make/model of the building component 504. As such, when the private local blockchain 540 outputs blocks to a public blockchain as described below, the private local blockchain 540 can excise the unique identifier while maintaining an association between the public identifier and any data associated with the building component 504.

In some embodiments, the private local blockchain 540 receives the device identifier via an application executed by the client device 524. The client device 524 can receive the device identifier based on the device identifier being provided to the client device 524. For example, the user interface 536 can receive the device identifier as a user input.

The client device 524 can use an image capture device, such as a camera, to detect a representation of the device identifier. For example, the building component 504 may include an image-based identifier, such as a QR code. The application executing on the client device 524 can cause the image capture device to detect the QR code, extract the device identifier from the QR code, and transmit the device identifier to the private local blockchain 540.

Local Rule Engine

The private local blockchain 540 can maintain a local rule engine 548. The local rule engine 548 can maintain rules, including policies and heuristics, that can be executed to verify transactions and other information regarding the private local blockchain 540. The local rule engine 548 can maintain predefined preferences regarding data communication policies, such as user defined preferences received via the application executing on the client device 524. The local rule engine 548 may maintain rules regarding transactions performed amongst building components 504, such as conditions under which a first building component 504 may transmit data via the private local blockchain 540 responsive to receiving a data access request from a second building component 504.

In some embodiments, the local rule engine 548 monitors transactions. The local rule engine 548 can retrieve transactions from the transaction ledger 556 described below, and execute one or more rules to monitor information such as whether a data requesting component 504 is authorized to request particular data, whether a data providing component 504 is authorized to provide the requested particular data, and whether either component 504 is authorized to perform a particular action using the requested particular data. Responsive to the transaction not satisfying the one or more rules, the local rule engine 548 can output an alert.

Network Nodes

The private local blockchain 540 can include a plurality of network nodes 552. In some embodiments, one or more network nodes 552 are implemented using at least one of the building components 504 that are on the private local blockchain 540. In some embodiments, one or more network nodes 552 are implemented by devices distinct from the building components 504 that are on the private local blockchain 540. The network nodes 552 may include oracle nodes.

In some embodiments, the plurality of network nodes 552 can provide data external to the private local blockchain 540 to the private local blockchain 540, such as to enable the private local blockchain 540 to execute smart contracts responsive to the external data. As described herein, the private local blockchain 540 can require building components 504 (and client devices 524) to be authenticated in order to communicate with other devices on the private local blockchain 540, which may limit the ability of the private local blockchain 540 to perform actions (e.g., execute smart contracts) that use data not locally maintained by devices of the private local blockchain 540 themselves. The plurality of network nodes 552 may be trustless nodes that provide external data based on an incentive to provide verifiable, accurate data. The plurality of network nodes 552 may provide external data such as weather data, price data (e.g., electricity prices), and traffic data.

Transaction Ledgering and Processing

The private local blockchain 540 can maintain a transaction ledger 556. The transaction ledger 556 can maintain a data structure corresponding to each transaction requested and/or executed by the building components 504. The transaction ledger 556 can represent a transparent, indelible record of each transaction executed by the building components 504. For example, each data structure corresponding to each transaction can indicate an identifier of each device involved in the transaction (e.g., a data requesting device and a data providing device), the action(s) that took place in the transaction (e.g., the data transmitted, the physical action performed, a type of the transaction) and a timestamp of the action(s). The transaction ledger 556 can represent all facility-level transactions that occur.

In some embodiments, the transaction ledger 556 maintains the data structure as a block. Each block can represent a transaction, and can include a representation of at least one previous transaction executed by the building components 504 on the private local blockchain 540. The transaction ledger 556 can use a device identifier of a particular building component 504 associated with a plurality of transactions performed by a same device to generate a chain of transactions corresponding to the particular building component 504. Each block can maintain a rules ledger (e.g., based on rules of the local rule engine 548), enabling each device that access the transaction ledger 556 to execute the rules of the private local blockchain 540.

In some embodiments, each block includes a block header including a hash of a previous block to provide the representation of the at least one previous transaction. The hash of the previous block can be generated by executing a predetermined hash function, such as a cryptographic hash function, on data of the previous block. As such, the transaction ledger 556 can be immutable, as each network node 552 and/or building component 504 can verify that the blocks of the transaction ledger 556 have not been compromised by executing the predetermined hash function on the blocks of the transaction ledger 556. In some embodiments, the predetermined hash function is less computationally intensive than typical blockchain hashing functions, which can reduce the computational burden on devices of the private local blockchain 540 in verifying the transaction ledger 556.

The private local blockchain 540 includes a transaction processor 560. The transaction processor 560 can execute the predetermined hash function on each transaction to generate each block. In some embodiments, the transaction processor 560 includes a special purpose processor used to perform cryptographic hashing and/or blockchain mining, such as a graphics processing unit (GPU). In some embodiments, the transaction processor 560 includes a network gateway. The transaction processor 560 may reduce the computational burden on other devices of the private local blockchain 540, such as building components 504, by executing a greater share of the hashing functionality performed by the private local blockchain 540. At the same time, because the private local blockchain 540 is a distributed network, each building component 504 and/or network node 552 can verify the transaction ledger 556 as desired by arbitrarily executing the predetermined hash function on blocks of the transaction ledger 556.

In some embodiments, a first building component 504 transmits, to a second building component 504, a request to access data of the second building component 504. The request can be generated as a network token. The second building component 504 can receive the request, and responsive to the request satisfying one or more data access rules, the second building component 504 can authorize the request by signing the network token. The first building component 504 and/or the second building component can transmit the network token to one or more network nodes 552. The one or more network nodes 552 can evaluate the network token using the local rule engine 548. Responsive to the network token satisfying the evaluation, the one or more network nodes 552 can authorize the first building component 504 to retrieve the requested data from the second building component 504, and maintain the retrieval as a transaction in the transaction ledger 556. The first building component 504 can transmit the requested data to additional building components 504, which may be useful for equipment troubleshooting and home automation applications.

In some embodiments, the second building component 504 enforces the one or more data access rules to selectively provide access to the first building component 504. For example, if the first building component 504 is a thermostat and the second building component 504 includes a temperature-based control point, the second building component 504 can compare a current temperature to one or more threshold temperatures, and permit the first building component 504 to control the temperature-based control point responsive to the current temperature satisfying the one or more thresholds.

Public Blockchain

Figure 6:
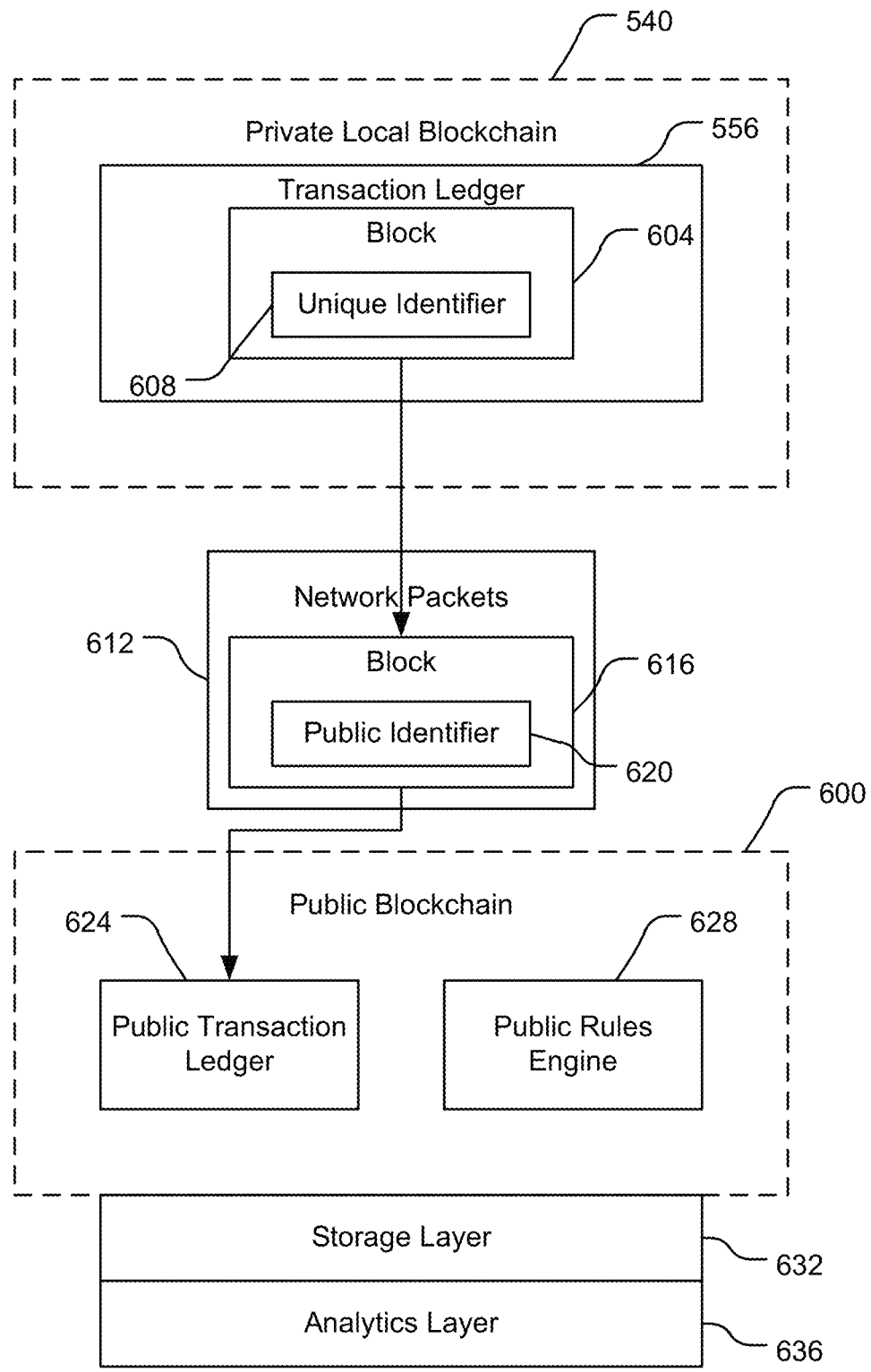
FIG. 6 is a block diagram of the private local blockchain of FIG. 5 communicating with a public blockchain, according to an embodiment.

Referring now to FIG. 6, the private local blockchain 540 can selectively communicate data with a public blockchain 600. As depicted in FIG. 6, the transaction ledger 556 of the private local blockchain 540 maintains, for each block 604, at least one unique identifier 608. The at least one unique identifier 608 can include an identifier of each building component 504 or other device involved in the transaction represented by the block 604. The at least one unique identifier 608 may include an identifier of a user of the private local blockchain (e.g., homeowner, facility manager). The at least one unique identifier 608 can include identifying characteristics such as a location of the building in which the building components 504 are located. While the transaction data represented in the block 604 may be useful for further processing, including aggregation across multiple facilities and building components 504, the block 604 may not be able to be transmitted outside of the private local blockchain 540 without compromising the privacy of the data represented by the at least one unique identifier 608.

The private local blockchain 540 can generate one or more network packets 612 representing a block 616 that include at least one public identifier 620 corresponding to the at least one unique identifier 608, rather than the at least one unique identifier 608 itself. The private local blockchain 540 can generate the at least one public identifier 620 by converting the at least one unique identifier 608 to an anonymous value. The block 616 may include other transaction data, such as an action performed by the building components 504 involved in the transaction represented by the block 604, that is not anonymized. In some embodiments, the private local blockchain 540 encrypts the one or more network packets 612 using a public key corresponding to a private key that the public blockchain 600 uses.

The public blockchain 600 includes a public transaction ledger 624 that receives the one or more network packets 612 and adds the block 616 to the public transaction ledger 624. In some embodiments, the public blockchain 600 decrypts the one or more network packets 612 to retrieve the block 616 from the one or more network packets 612. The public transaction ledger 624 can be similar to the transaction ledger 556 described with reference to FIG. 5. The public transaction ledger 624 can consolidate data from various building components 504 and private local blockchains 540.

The public blockchain 600 includes a public rules engine 628. The public rules engine 628 can be similar to the local rule engine 548 described with reference to FIG. 5, and can manage requests from devices outside of the private local blockchain 540 to perform transactions with building components 504 on the private local blockchain 540. In some embodiments, the public rules engine 628 generates a special key that can be used by a device to connect to the private local blockchain 540. The private local blockchain 540 can maintain records of transaction requests from the public blockchain 600 in the transaction ledger 556.

Storage and Analytics Layers

In some embodiments, a storage layer 632 receives data from the public transaction ledger 624. The storage layer 632 may convert the data from the public transaction ledger 624 from a blockchain-based data structure to a database structure. The storage layer 632 may obviate the need for a system to integrate multiple, disparate application programming interfaces (APIs) in order to perform computations on the data of the storage layer 632.

In some embodiments, an analytics layer 636 executes computations based on data of the storage layer 632 (e.g., data received from the public transaction ledger 624). The analytics layer 636 can generate models indicative of behavior of the building components 504, and use the models to predict performance of each individual building component 504. For example, the analytics layer 636 can use the data of the storage layer 632 to estimate a likelihood of failure of a particular building component 504 as a function of time, and generate a transaction request to perform a service/maintenance action on the particular building component 504 based on the estimated likelihood. The analytics layer 636 can predict energy usage by building components 504.

Smart Contracts

Referring further to FIG. 5, the private local blockchain 540 can execute a plurality of smart contracts. Each smart contract can be a data structure including one or more inputs, one or more conditions, one or more states, and one or more outputs. The private local blockchain 540 can evaluate the one or more conditions based on the one or more inputs to set the state of the contract. Responsive to a state change, the smart contract can generate a corresponding contract.

For example, the private local blockchain 540 can use a smart contract to automate a warranty claim. The smart contract can receive sensor data associated with a particular building component 504 as an input. The smart contract can evaluate one or more conditions, such as whether the building component 504 is performing according to appropriate performances parameters, using the sensor data. Responsive to the building component 504 not performing according to the performance parameters, the smart contract can change to a warranty request state (e.g., a failure state), and generate a warranty request as an output. The smart contract can record the failure along with important data points that led up to, or occurred after the malfunction. In some embodiments, the smart contract maintains a service record and provides the service record with the warranty request. The private local blockchain 540 can maintain the warranty request as a transaction in the transaction ledger 556.

By automating the smart contract process, the private local blockchain 540 can cause electronic funds transactions to occur with greater certainty. In existing building management systems, there may be administrative costs and/or electronic overhead associated with generating warranty and servicing requests. Existing solutions may address these issues by using a single trusted entity, but such solutions may still require manual intervention. The present solution uses smart contracts that are self-executing based on a set of instructions, conditions, and outcomes. This can be used to define the ways money is transferred, and actually facilitate the transfer when all conditions are met. The private local blockchain 540 enables trusted storage, and the smart contract enable distribution of various types of transactions based on trustworthy computations.

The present solution can enable improved proof of origin associated with supply chains for manufacturing and distribution of the building components 504. For example, a supply chain blockchain similar to the private local blockchain 540 can use smart contracts to automate purchasing of components or materials, receiving and paying for components and materials, and track storage and use. As such, the supply chain blockchain can maintain a transparent supply chain record that can be verified to confirm appropriate sourcing and process life cycle. For example, there may be an effort to track the reduction of hazardous materials, and make sure raw materials are not being procured from conflict areas. However, delivery and compliance tracking of these components and raw materials are costly to facilitate. The supply chain blockchain can be used to generate a unique quality certificate for raw materials and components. The test results of the quality and/or lab tests can be executed based on established specifications loaded directly on the supply chain blockchain, with the certificates and test documents. The supply chain blockchain can maintain record of the results of the batches, reporting the values back in digital values, images, or both. The supply chain blockchain can use a smart contract to verify the test results are not used to verify another batch. The supply chain blockchain can release payment to the vendor responsive to the test results satisfying the smart contract.

Referring further to FIG. 5, the private local blockchain 540 can automate workflows amongst building components 504 while reducing a risk of compromise of the data security associated with the building components 504 by enabling trusted communications amongst the building components 504 via the private local blockchain 540. For example, in a home implementation, an access control device (e.g., door lock) may detect an access request from an access device (e.g., keyfob). The access control device can unlock the door responsive to the access request satisfying one or more access control rules (e.g., a code provided by the access device is authenticated). The access control device can transmit a notification to other components that the door has been unlocked, such as a motion detector (which can verify the presence of the user, cause a lighting system to activate, and cause an HVAC system to adjust a temperature setpoint to a predetermined value). The access control device can automatically lock the door responsive to a period of time expiring subsequent to unlocking the door. The lighting system can automatically activate outdoor lights responsive to receiving an indication (e.g., from network nodes 552) of a time corresponding to sundown occurring. Unlike in existing home automation systems, in which compromise of one of the building components 504 could enable an external agent to access various other building components 504, such as to identify patterns of behavior of users of the building components 504. Because the present solution validates each transaction (e.g., each data communication) on the private local blockchain 540, the risk of unauthorized access and other data compromise can be reduced.

Figure 7:
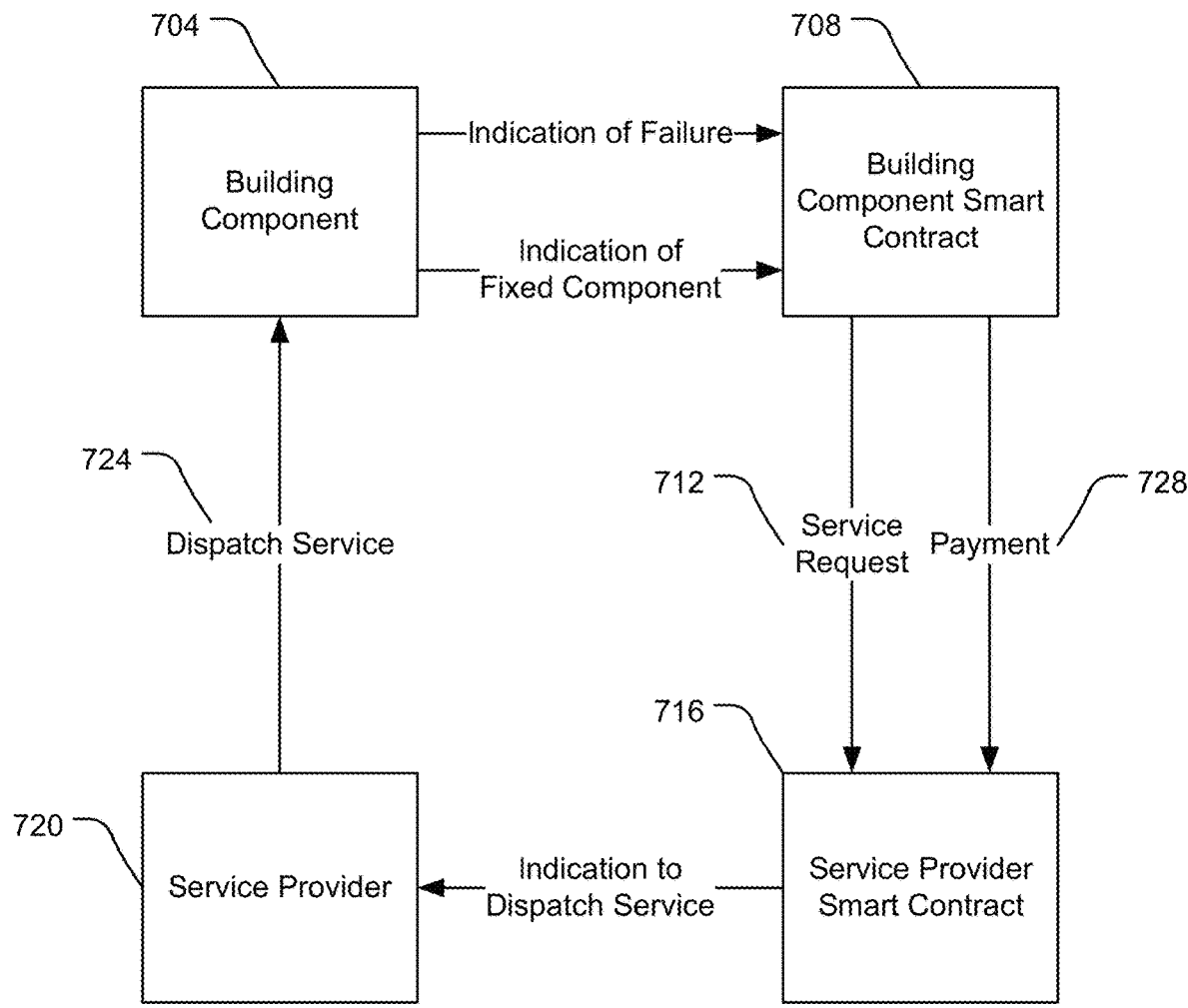
FIG. 7 is a flow diagram of a smart contract workflow automation, according to an embodiment.

Referring now to FIG. 7, a process flow 700 of a smart contract is depicted. The process flow 700 can be executed using the DBS 500 and public blockchain 600 described with reference to FIGS. 5-6. Each action depicted in FIG. 7 may be maintained as a block representing the action in a transaction ledger.

As depicted in FIG. 7, a building component 704 enters a failure state. For example, the building component 704 may be an HVAC component that fails to achieve a desired setpoint of a performance variable, such as temperature of fluid flow rate. A sensor may detect the failure state.

Responsive to receiving an indication of the building component 704 entering the failure state from the building component 704 and/or the sensor, a first smart contract 708 evaluates one or more service conditions associated with operation of the building component 704. Based on the evaluation, the first smart contract 708 can determine to generate a service request 712, and transmit the service request 712 to one or more second smart contracts 716. Each second smart contract 716 may evaluate one or more service provision conditions based on the service request (e.g., determine if the service provider is obligated to fulfill the service request 712). Responsive to determining the service request 712 to satisfying the service provision condition(s), the second smart contract 716 can indicate to a corresponding service provider 720 to dispatch service 724, such as to repair the building component 704.

The first smart contract 708 can monitor the state of the building component 704, and detect that the building component 704 is fixed based on the monitoring of the state. The first smart contract 708 can evaluate one or more conditions associated with repairing of the building component 704 to determine whether to release payment 728 to the second smart contract 716. For example, responsive to determining that the building component 704 is operating in a nominal state within a predetermined period of time of transmitting the service request 712, the first smart contract 704 can authorize release of payment 728.

Figure 8:
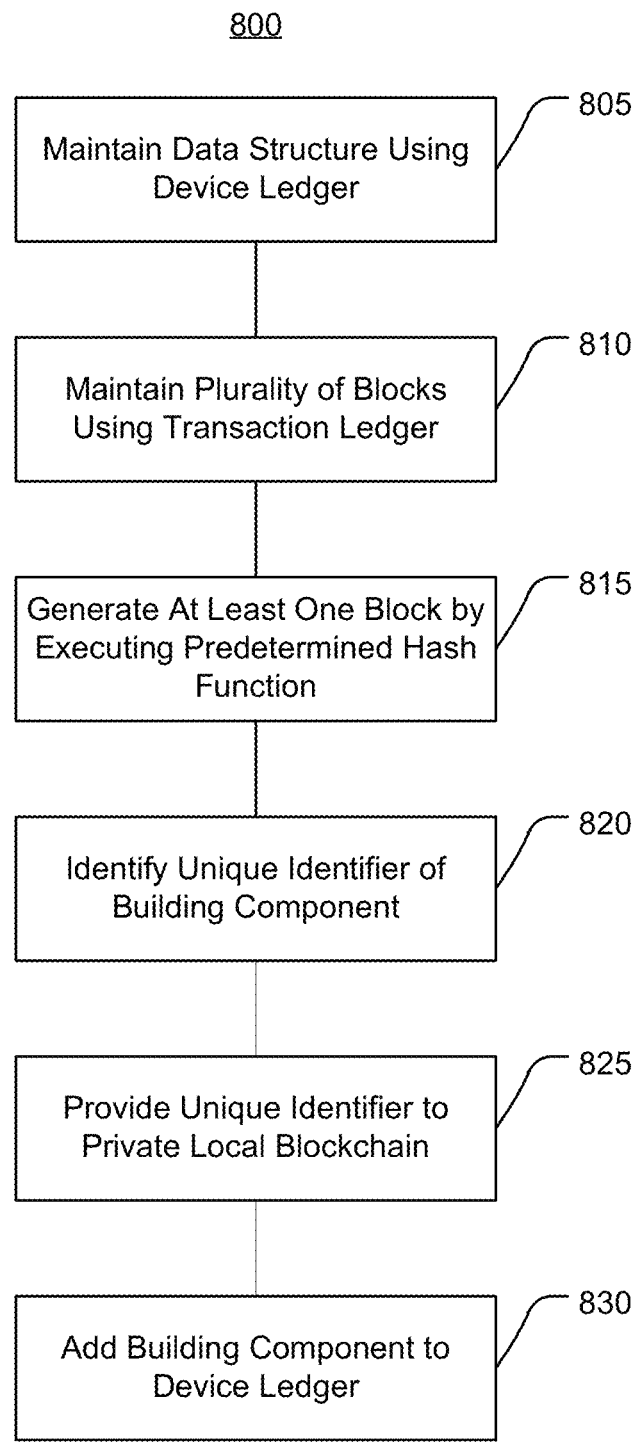
FIG. 8 is a flow diagram of a method of operating a private local blockchain, according to an embodiment.

Referring now to FIG. 8, a method 800 of operating a private local blockchain is depicted. The method 800 can be performed using various systems described herein, including the DBS 500 and public blockchain 600 described with reference to FIGS. 5-6.

At 805, a device ledger of a private local blockchain maintains a data structure indicating a plurality of first building components of the private local blockchain. Each building component can include a smart device, such as a sensor, actuator, controller, HVAC component, and/or switch. Each building component can include a processing circuit and a communications circuit. The private local blockchain can execute on the plurality of first building components and/or a plurality of network nodes. The data structure can include a list of each first building component and a first unique identifier of each first building component.

At 810, a transaction ledger of the private local blockchain maintains a plurality of blocks. Each block can correspond to a transaction between at least two first building components of the plurality of first building components. Each block can include the at least one first unique identifier of the corresponding first building component, data associated with the transaction (e.g., the data transmitted, the physical action performed, a type of the transaction), and a timestamp of the transaction.

At 815, a transaction processor of the private local blockchain generates at least one block by executing a predetermined hash function using a previous block. The previous block may have been entered in the transaction ledger prior to the at least one block based on a timestamp of the previous block. In some embodiments, the transaction processor is specifically configured for hashing/blockchain mining operations, such as by including a specially designed processor (e.g., a GPU). In some embodiments, building components and/or network nodes can validate the transaction ledger by executing the predetermined hash function on the one or more blocks.

At 820, a client device identifies at least one second unique identifier of a second building component. The client device may receive the at least one second unique identifier as a user input. The client device may use an image capture device to detect an image-based encoding of the at least one second unique identifier, such as a QR code.

At 825, the client device provides the at least one second unique identifier to the private local blockchain. The client device may decode the image-based representation to provide the at least one second unique identifier. The client device may provide the image-based representation for the private local blockchain to decode.

At 830, the private local blockchain determines to add the second building component to the device ledger using the at least one second unique identifier and the rules engine. For example, the private local blockchain can determine that the second building component is a trusted component.

In some embodiments, the method 800 includes providing an anonymized version of the block(s) of the transaction ledger to a public blockchain to be maintained by a public transaction ledger of the public blockchain. For example, the private local blockchain can generate one or more packets including an output block of the plurality of blocks of the transaction ledger, the output block including a public identifier corresponding to the at least one first unique identifier of the block from which the output block is generated. The private local blockchain can provide the one or more packets to the public blockchain. The public blockchain can add the output block to the public transaction ledger.

In some embodiments, the method 800 includes using an analytics layer to generate models representative of building component performance using the anonymized data of the public blockchain. The analytics layer can receive the blocks from the public blockchain, and extract data corresponding to the transactions represented by the blocks. The analytics layer can generate a predictive model representing behavior of building components based on the extracted data.

The method 800 can include using a plurality of network nodes, such as oracles, to provide external data to the private local blockchain. The private local blockchain can execute smart contracts by using the external data as an input that the smart contract uses to evaluate one or more conditions, and change a state of the smart contract based on the evaluation. The external data can include weather data, price data, and/or traffic data.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system, comprising:
a blockchain implemented by one or more hardware processors to:
use a sensor to monitor a state of a building component, the building component having a unique identifier;
evaluate a smart contract responsive to an indication, obtained from the sensor, that the state of the building component is associated with a service condition, the service condition indicating that the building component failed to achieve a desired setpoint of a performance variable;
generate a service request, the service request including one or more data points associated with a malfunction of the building component associated with the service condition;
maintain the service request in a transaction ledger of the blockchain; and
output the service request for a service provider to repair the building component associated with the service condition.

2. The system of claim 1, wherein the building component is a first building component of a plurality of building components, comprising:
the plurality of building components including the one or more hardware processors;
the blockchain implemented by the one or more hardware processors of the plurality of building components; and
the blockchain including the transaction ledger that maintains a plurality of blocks, each block corresponding to a transaction between at least two building components of the plurality of building components, each block including at least one unique identifier of the corresponding building component and a timestamp of the corresponding transaction.

3. The system of claim 1, comprising:
a plurality of building components including the first building component.

4. The system of claim 1, comprising:
the building component including a processing circuit comprising at least one of the one or more hardware processors and a communications circuit.

5. The system of claim 1, comprising:
the building component including at least one of an actuator or an HVAC component.

6. The system of claim 1, comprising:
the blockchain including the transaction ledger that maintains a plurality of blocks, at least one block of the plurality of blocks including a block header including a hash of a previous block.

7. The system of claim 1, comprising:
the building component configured to transmit a network token to a second building component, the network token including a request to access data of the second building component.

8. The system of claim 1, comprising:
a public blockchain to communicate with a private local blockchain.

9. The system of claim 1, comprising:
the blockchain including a supply chain record.

10. The system of claim 1, comprising:
the blockchain configured to use the smart contract to authorize a payment for repair of the building component.

11. A method, comprising:
monitoring, by a blockchain, a state of a building component, the building component having a unique identifier;
evaluating, by the blockchain, a smart contract responsive to determining, based on sensor data from a sensor of the building component, that the building component is in a service condition, the service condition indicating that the building component failed to achieve a desired setpoint of a performance variable;
generating, by the blockchain, a service request, the service request including one or more data points associated with a malfunction of the building component associated with the service condition;
maintaining, by the blockchain, the service request in a transaction ledger of the blockchain; and
outputting, by the blockchain, the service request for a service provider to repair the building component associated with the service condition.

12. The method of claim 11, wherein the building component is a first building component of a plurality of building components, comprising:
maintaining, by the blockchain, the transaction ledger, the transaction ledger including a plurality of blocks, each block corresponding to a transaction between at least two building components of the plurality of building components, each block including a timestamp of the corresponding transaction.

13. The method of claim 11, comprising:
the transaction ledger including a block corresponding to a transaction involving the building component, the block including the unique identifier of the building component.

14. The method of claim 11, wherein the building component is a remote building component, comprising:
operating, by the building component, a communications circuit to communicate one or more blocks of a plurality of blocks with the remote building component.

15. The method of claim 11, comprising:
the blockchain including a private local blockchain.

16. The method of claim 11, comprising:
the transaction ledger indicating a block, the block including a block header that includes a hash of a previous block.

17. The method of claim 11, wherein the building component is a first building component of a plurality of building components, comprising:
transmitting, by the first building component to a second building component of the plurality of building components, a network token that includes a request to access data of the second building component.

18. The method of claim 11, wherein the blockchain includes a private local blockchain comprising:
transmitting, by the blockchain, a communication to a public blockchain.

19. The method of claim 11, comprising:
maintaining, by the blockchain, a supply chain record.

20. The method of claim 11, comprising:
authorizing, by the blockchain using the smart contract, a payment for repair of the building component.

* * * * *